(12) United States Patent
Lee et al.

(10) Patent No.: US 9,423,653 B2
(45) Date of Patent: Aug. 23, 2016

(54) BACK LIGHT UNIT AND DISPLAY DEVICE

(71) Applicant: SAMSUNG DISPLAY CO., LTD., Yongin, Gyeonggi-Do (KR)

(72) Inventors: Ki Chang Lee, Chungcheongnam-do (KR); Byung Kook Sim, Seoul (KR); Sung-Hun Lee, Chungcheongnam-do (KR); Masaru Matsuzawa, Chungcheongnam-do (KR); Hyun Su Park, Gyeonggi-Do (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 65 days.

(21) Appl. No.: 14/305,555

(22) Filed: Jun. 16, 2014

(65) Prior Publication Data
US 2015/0016090 A1    Jan. 15, 2015

(30) Foreign Application Priority Data

Jul. 11, 2013  (KR) .................. 10-2013-0081810

(51) Int. Cl.
*G02F 1/1335* (2006.01)

(52) U.S. Cl.
CPC ... *G02F 1/133608* (2013.01); *G02F 1/133605* (2013.01)

(58) Field of Classification Search
CPC .......... G02F 1/133608; G02F 1/133605; G02F 2001/133317; G02F 2201/503; G02B 6/0086
See application file for complete search history.

(56) References Cited

U.S. PATENT DOCUMENTS

| 5,659,376 | A | 8/1997 | Uehara et al. | |
|---|---|---|---|---|
| 6,950,154 | B2 * | 9/2005 | Lee | G02B 6/0088 349/58 |
| 7,106,393 | B2 * | 9/2006 | Lee | G02B 6/0088 349/58 |
| 7,275,852 | B2 * | 10/2007 | Kim | G02F 1/133608 362/609 |
| 7,589,803 | B2 * | 9/2009 | Huo | G02B 6/0086 349/65 |
| 7,625,112 | B2 * | 12/2009 | Ko | F21V 19/009 362/225 |
| 7,832,884 | B2 * | 11/2010 | Ryu | G02F 1/133604 362/218 |

(Continued)

FOREIGN PATENT DOCUMENTS

| JP | 2000-133006 | 5/2000 |
|---|---|---|
| KR | 10-1999-0008719 A | 2/1999 |

(Continued)

*Primary Examiner* — Anh Mai
*Assistant Examiner* — Zachary J Snyder
(74) *Attorney, Agent, or Firm* — Lee & Morse, P.C.

(57) ABSTRACT

A backlight unit includes: a bottom chassis including a lower portion and side portions enclosing the lower portion; a light source plate to which a light source is attached; a diffuser configured to diffuse light generated from the light source; an optical sheet disposed on the diffuser and adapted to further diffuse the light diffused by the diffuser; and a first mold including a first inclined portion which is disposed between the diffuser and the optical sheet and may prevent the diffuser and the optical sheet from contacting each other, the first inclined portion may reflect light transmitted by the diffuser and emitted from the side of the diffuser toward the bottom chassis.

22 Claims, 8 Drawing Sheets

Light path

(56) References Cited

U.S. PATENT DOCUMENTS

| | | | |
|---|---|---|---|
| 7,883,232 B2 | 2/2011 | Bang | |
| 7,948,572 B2* | 5/2011 | Bae | G02F 1/133308 349/58 |
| 8,045,094 B2 | 10/2011 | Teragawa | |
| 8,130,339 B2* | 3/2012 | Wu | G02B 6/0055 349/65 |
| 8,337,042 B2* | 12/2012 | Sudo | G02F 1/133604 362/219 |
| 8,724,047 B2* | 5/2014 | Yu | G02F 1/133615 349/58 |
| 2003/0223249 A1* | 12/2003 | Lee | G02F 1/133604 362/561 |
| 2004/0008512 A1* | 1/2004 | Kim | G02F 1/133308 362/235 |
| 2004/0008524 A1* | 1/2004 | Lee | G02F 1/133604 362/561 |
| 2004/0062029 A1* | 4/2004 | Ato | G02B 6/0088 362/632 |
| 2004/0135936 A1* | 7/2004 | Lee | G02B 6/0043 349/64 |
| 2004/0223313 A1* | 11/2004 | Yu | F21V 19/04 362/613 |
| 2005/0036296 A1* | 2/2005 | Kim | G02B 6/002 362/632 |
| 2005/0099604 A1* | 5/2005 | Mizumaki | G03B 23/08 353/27 R |
| 2005/0281050 A1* | 12/2005 | Chou | F21K 9/00 362/612 |
| 2006/0187372 A1* | 8/2006 | Kim | G02F 1/133608 349/58 |
| 2006/0256583 A1* | 11/2006 | Shimizu | G02B 6/0071 362/633 |
| 2007/0030663 A1* | 2/2007 | Ryu | F21V 19/008 362/23.18 |
| 2007/0138936 A1* | 6/2007 | Chang | H01J 61/305 313/493 |
| 2008/0130315 A1* | 6/2008 | Song | G02B 6/0091 362/617 |
| 2008/0143918 A1* | 6/2008 | Kim | G02F 1/133608 349/58 |
| 2008/0225197 A1* | 9/2008 | Maruyama | G02F 1/133308 349/58 |
| 2008/0225198 A1* | 9/2008 | Azuma | G02F 1/133604 349/58 |
| 2010/0079976 A1* | 4/2010 | Kamada | G02F 1/133604 362/97.1 |
| 2010/0309410 A1* | 12/2010 | Yang | G02B 6/0088 349/64 |
| 2011/0285935 A1 | 11/2011 | Sasaki et al. | |
| 2012/0050645 A1* | 3/2012 | Okada | G02F 1/133611 349/64 |
| 2012/0250354 A1* | 10/2012 | Yoshida | G02B 6/0085 362/613 |
| 2012/0327311 A1* | 12/2012 | Kuromizu | G02F 1/133603 348/739 |
| 2013/0050587 A1* | 2/2013 | Namekata | G02F 1/133608 348/739 |
| 2013/0242609 A1* | 9/2013 | Mori | G02B 6/0088 362/611 |
| 2014/0085569 A1* | 3/2014 | Choi | G02F 1/133606 349/64 |
| 2014/0111735 A1* | 4/2014 | Cho | G02F 1/133608 349/58 |
| 2014/0176867 A1* | 6/2014 | Huang | G02B 6/0081 349/65 |

FOREIGN PATENT DOCUMENTS

| | | |
|---|---|---|
| KR | 10-070480 B1 | 10/2007 |
| KR | 10-2014-0010833 A | 1/2014 |

* cited by examiner

BACK LIGHT UNIT AND DISPLAY DEVICE

CROSS-REFERENCE TO RELATED APPLICATION

The present application claims priority under 35 U.S.C. §119 to Korean Patent Application No. 10-2013-0081810, filed on Jul. 11, 2013, in the Korean Intellectual Property Office, and entitled: "Back Light Unit and Display Device," which is incorporated by reference herein in its entirety.

BACKGROUND

1. Field

Embodiments relate to a backlight unit and a display device including the same.

2. Description of the Related Art

As a display device, there are a self-emitting type display devices, such as a light emitting diode displays (LED), field emission displays (FED), vacuum fluorescent displays (VFD), and plasma display panels (PDP), which emit light by themselves, and light receiving type display devices, such as a liquid crystal displays (LCD) and electrophoretic displays, which do not emit light by themselves and therefore require a light source.

SUMMARY

A backlight unit is provided, including a bottom chassis including a lower portion and side portions enclosing the lower portion, a light source plate to which a light source is attached, a diffuser for to diffusing light generated from the light source, an optical sheet on the diffuser for further diffusing the light diffused by the diffuser, and a first mold including a first inclined portion between the diffuser and the optical sheet to prevent the diffuser and the optical sheet from contacting each other, the first inclined portion reflecting light emitted from a side of the diffuser toward the bottom chassis.

An end of the first inclined portion may be seated on one of the side portions of the bottom chassis.

The optical sheet may be disposed at an upper end of the first mold, and the diffuser may be under the first inclined portion.

The backlight unit may also include a second mold, and the diffuser may be seated on an upper portion of the second mold and spaced apart from the first inclined portion. A second inclined portion of the second mold may reflect the light generated from the light source toward the diffuser. A portion of the second mold may be disposed on the bottom chassis, and the second inclined portion may be spaced apart from the bottom chassis.

The first mold may be connected to the second mold by a connection portion, and the connection portion may connect the upper portion of the second mold to an end portion of the inclined portion of the first mold.

The light source may be a light emitting diode or a cathode fluorescent lamp.

A display device is provided including a display panel and a backlight unit adapted to supply light to the display panel. The backlight unit may include a bottom chassis including a lower portion and side portions enclosing the lower portion, a light source plate onto which a light source is attached, a diffuser for diffusing light generated from the light source, an optical sheet on the diffuser for further diffusing the light diffused by the diffuser, and a first mold including a first inclined portion between the diffuser and the optical sheet, to prevent the diffuser and the optical sheet from contacting to each other, the first inclined portion reflecting light emitted from a side of the diffuser toward the bottom chassis.

The display unit may include a second mold. The diffuser may be seated on an upper portion of the second mold and be spaced apart from the first inclined portion. The second mold may also include a second inclined portion which reflects the light generated from the light source toward the diffuser. A portion of the second mold may be disposed on the bottom chassis, and the second inclined portion may be spaced apart from the bottom chassis.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
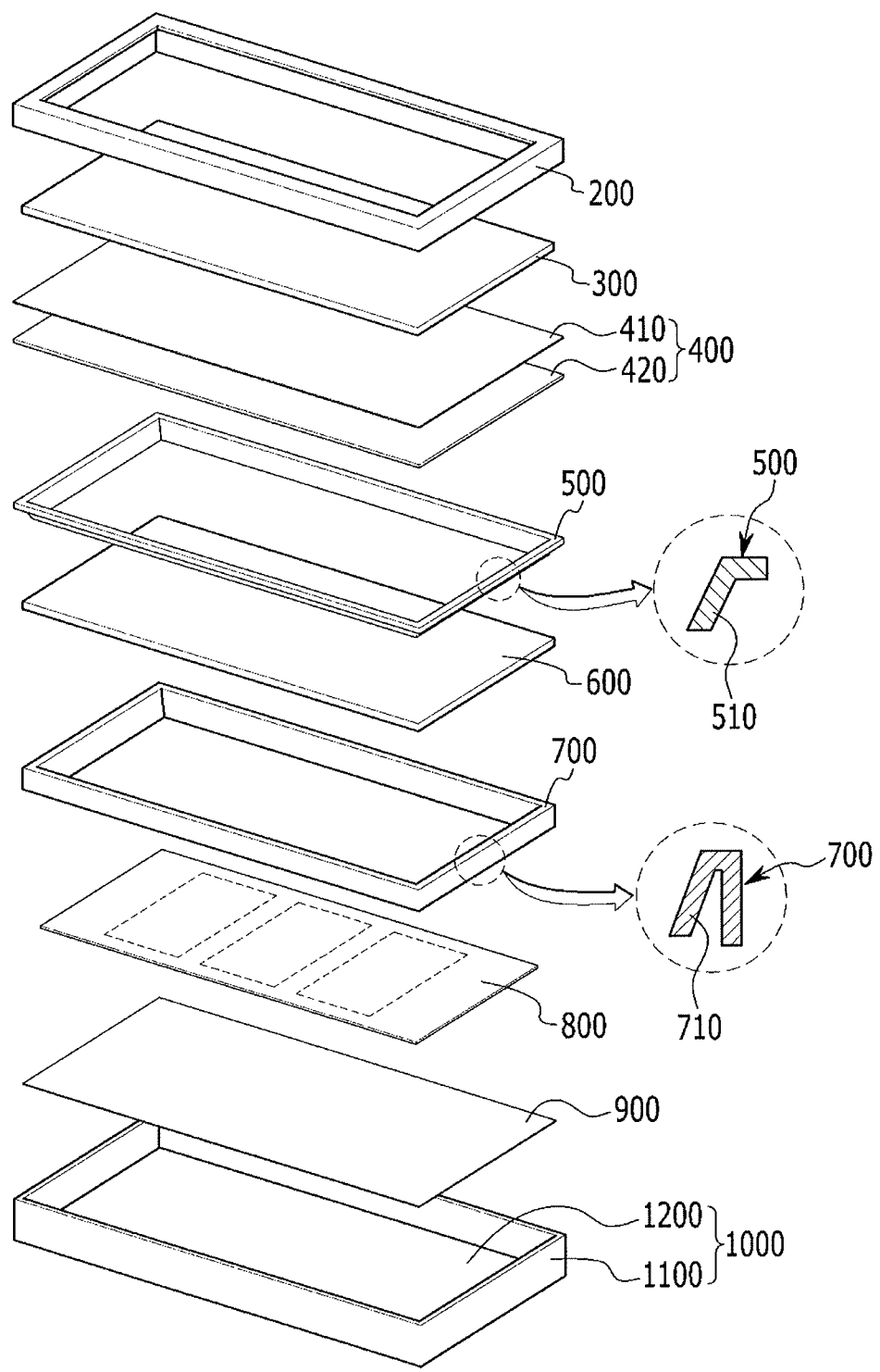
FIG. 1 illustrates an exploded perspective view of a display device including a backlight unit according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. Like reference numerals refer to like elements throughout.

A display device according to an exemplary embodiment will be described with reference to FIGS. 1 and 2.

FIG. 1 illustrates an exploded perspective view of the display device according to an exemplary embodiment.

Figure 2:
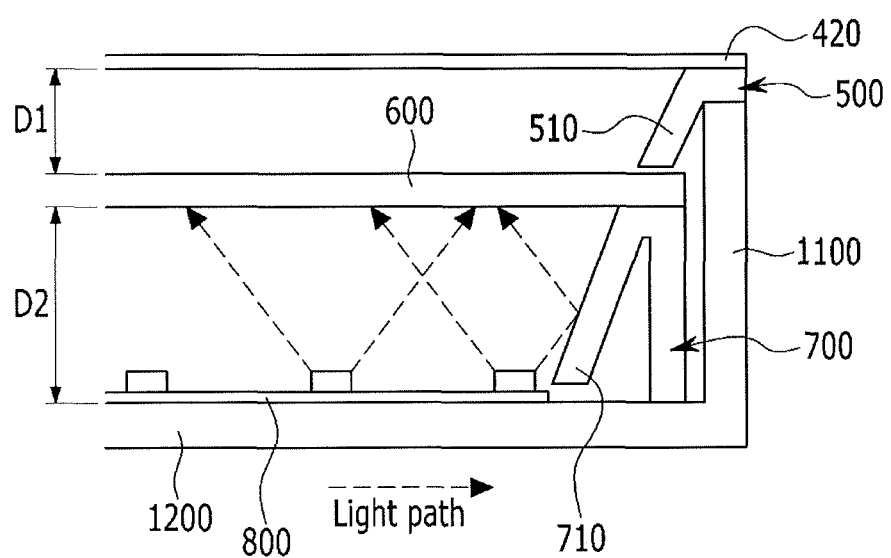
FIG. 2 illustrates a cross-sectional view of an optical sheet, an upper mold, a diffuser, and a lower mold according to an exemplary embodiment.

FIG. 2 illustrates a cross-sectional view of an optical sheet, an upper mold, a diffuser, and a lower mold according to the exemplary embodiment.

Referring to FIGS. 1 and 2, the display device according to an exemplary embodiment includes a backlight unit, a top chassis 200, and a display panel 300, which are coupled with each other. However, the display device illustrated in FIG. 1 is illustrative only, and therefore not limiting.

The backlight unit supplies light to the display panel 300 and improves luminance while guiding the light.

The top chassis 200 includes an opening which exposes a display area of the display panel 300 to the outside. The top chassis 200 may have a quadrangular band shape which includes a front portion covering an edge portion of an upper surface of the display panel 300 and side portions enclosing or covering sides the display panel 300 and the backlight unit. The front portion and the side portions of the top chassis 200 may be bent at approximately a right angle to each other.

The display panel 300 may be a display panel which is included in various flat panel displays (FPDs), such as a liquid crystal display (LCD), an organic light emitting device (OLED), and an electrowetting display (EWD). In the case of a liquid crystal display, the display panel 300 may include lower upper display panels (not illustrated) facing each other and a liquid crystal layer (not illustrated) interposed therebetween, when being viewed in a cross sectional structure. In particular, the display panel 300 of the display device according to an exemplary embodiment may be a display panel of a light receiving type display device and in the case of the self-emitting type display device like an organic light emitting display, the backlight unit may be omitted.

The display panel 300 includes a plurality of signal lines and a plurality of pixels which are connected to the plurality of signal lines and are arranged in substantially a matrix form. The signal line includes a plurality of gate lines (not illustrated) transferring gate signals, and a plurality of data lines (not illustrated) transferring a data voltage.

Each pixel may include at least one switching element connected to the corresponding gate line and the corresponding data line and at least one pixel electrode connected to the switching element. The switching element may include at least one thin film transistor and may be turned on or turned off depending on the gate signal transferred by the gate line to be able to selectively transfer the data voltage transferred by the data line to the pixel electrode. Each pixel may display an image of the corresponding luminance depending on the data voltage applied to the pixel electrode.

Each component of the backlight unit may be fixedly received on a bottom chassis 1000.

The top chassis 200 and the bottom chassis 1000 may fixedly support each component of the display device. Further, the top chassis 200 and the bottom chassis 1000 may be coupled with each other. The bottom chassis 1000 may include a lower portion 1200 and a side portion 1100 enclosing the lower portion.

The backlight unit will be described in detail with reference to FIGS. 1 and 2.

The backlight unit according to an exemplary embodiment may include a sheet 400, an upper mold 500, a diffuser 600, a lower mold 700, a light source plate 800, a reflective layer 900, and a bottom chassis 1000. However, the backlight unit illustrated in FIG. 1 is illustrative only, and therefore not limiting. Therefore, embodiments may be applied to a display device having another structure.

The light source plate 800 may include a light source. The light source plate 800 may be made of at least one of glass, indium-tin-oxide (ITO), and indium-zinc-oxide (IZO) so that the light source plate 800 may transmit light reflected from the reflective layer 900.

An example of a light source that may be included in the light source plate 800 includes a cold cathode fluorescent lamp (CCFL), a flat fluorescent lamp (FFL), a light emitting diode (LED), and the like. Recently, light emitting diodes (LEDs) having less power consumption and heating value are frequently used as a light source. FIG. 1 illustrates an LED light source, but embodiments are not limited thereto. Therefore, some embodiments may use other light sources instead of an LED. However, the case in which the LED is used as the light source will be described below.

The light emitting diode (LED) may be connected to a wiring (not illustrated) to be electrically connected to an external power supply, in which the wiring may be formed on the light source plate 800. In this case, the wiring may be made of a transparent material for a light path. For example, a wiring made of a transparent material such as indium-tin-oxide (ITO) or indium-zinc-oxide (IZO) may be formed on the light source plate 800, made of glass and the like.

The light source plate 800 may be formed in a single integrated plate without an opening, and the light source plate 800 formed in a single integrated plate may be formed in plural. Each of the light source plates 800 formed in plural may be fastened with the lower portion 1200 of the bottom chassis 1000 or may be attached on the lower portion 1200 of the bottom chassis 1000 by using a tape, or the like.

Sheet 400 may include at least one optical sheet of a diffuser sheet (not illustrated), a prism sheet 410, an optical sheet 420, or the like. Depending on the exemplary embodiment, the sheet may also include a luminance enhancement film such as DBEF. The sheet 400 may improve uniformity of luminance of light transmitted by the diffuser 600 and improve light transmittance efficiency. The optical sheet 420 according to an exemplary embodiment may be disposed separated from the diffuser 600.

The diffuser 600 according to an exemplary embodiment may be disposed between the upper mold 500 and the lower mold 700. The diffuser 600 may uniformly diffuse light incident from the light source may improve the uniformity and luminance of the light. That is, the diffuser 600 may disperse light incident from the light source and may prevent the light from being locally concentrated.

When the light generated from the light source is incident on the reflective layer 900, the reflective layer 900 reflects the light toward the display panel 300.

A structure of upper mold 500 and lower mold 700 will be described in detail with reference to FIG. 2.

The lower mold 700 may provide a region in which the diffuser 600 is seated. Further, the upper mold 500 may be formed on the diffuser 600. When the display device is turned over, the upper mold 500 may support the diffuser 600. Further, the upper mold 500 may provide a region in which the optical sheet 420 may be seated. Because the diffuser 600 may be seated on the lower mold 700 and the optical sheet 420 may be seated on the upper mold 500, the diffuser 600 and the optical sheet 420 may be separated from each other. An upper end of the upper mold 500 may be flat such that the optical sheet 420 may be seated thereon. Further, an upper end of the lower mold 700 may be flat such that the diffuser 600 may be seated thereon.

The upper mold 500 according to an exemplary embodiment includes an inclined portion 510. The inclined portion 510 of the upper mold 500 may prevent or substantially prevent light leakage from occurring with light transmitted by the diffuser 600. Further, a portion of the upper mold 500 may be seated on the side portion 1100 of the bottom chassis 1000. The inclined portion 510 of the upper mold 500 may not contact the side portion 1100 of the bottom chassis 1000. The inclined portion 510 of the upper mold 500 may not contact the diffuser 600. The included portion 510 may contact the diffuser 600 when the display device is turned over.

The lower mold 700 according to an exemplary embodiment includes an inclined portion 710. The inclined portion 710 of the lower mold 700 may be obliquely formed from the upper end of the lower mold 700 to the lower portion 1100 of the bottom chassis 1000. Further, the inclined portion 710 of the lower mold 700 may be formed so that light generated from the light source may be reflected from the inclined portion 710 of the lower mold 700 toward the display panel 300. A portion of the lower mold 700 may be disposed on the lower portion 1100 of the bottom chassis 1000. A portion of the lower mold 700 disposed on the lower portion 1100 of the bottom chassis 1000 may be formed with the inclined portion 710 of the lower mold 700. The inclined portion 710 of the lower mold 700 may reflect light generated from the light source. The lower mold 700 may not contact the lower portion 1100 of the bottom chassis 1000. The inclined portion 710 of the lower mold 700 according to an exemplary embodiment may reflect light generated from an LED. Because the inclined portion 710 of the lower mold 700 may reflect light, the inclined portion 710 of the lower mold 700 may reflect light generated by a light source toward the display panel 300 and may prevent the light from being leaked.

The diffuser 600 may be separated from the optical sheet 420 so as to be disposed between the inclined portion 510 of the upper mold 500 and the upper end of the lower mold 700. The diffuser 600 may be disposed to be spaced apart from the optical sheet 420 at a predetermined distance D1. The diffuser 600 may be disposed to be spaced apart from the lower portion 1100 of the bottom chassis 1000 at a predetermined distance D2.

According to an exemplary embodiment, distance D1 may be from 10 mm to 15 mm. According to an exemplary embodiment, distance D2 may be from 15 mm to 20 mm.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples An effect according to an exemplary embodiment will be described with reference to FIGS. 3 to 5.

Figure 3:
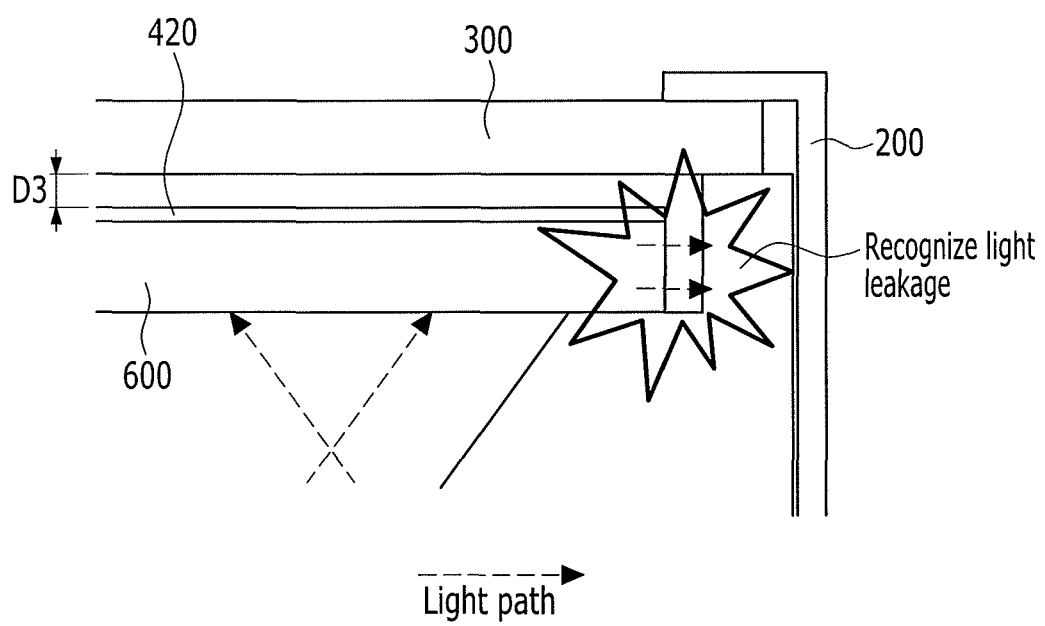
FIG. 3 illustrates a cross-sectional view illustrating an optical sheet and a diffuser according to a Comparative Example.

FIG. 3 illustrates a cross-sectional view illustrating an optical sheet and a diffuser according to a Comparative Example.

According to the Comparative Example, the diffuser 600 may contact the optical sheet 420. Further, the optical sheet 420 may be spaced apart from the display panel 300 at a predetermined distance D3. According to an exemplary embodiment, the D3 may be 2 mm. Therefore, the diffuser 600 may be disposed to be spaced apart from the panel by about 2 mm.

Because the diffuser 600 may be disposed at a place close to the display panel 300, and the side portion of the top chassis 200 may become thin, light which is transmitted by the diffuser 600 and emitted from the side of the diffuser 600, may cause a light leakage phenomenon that may be observed by a user.

Figure 4:
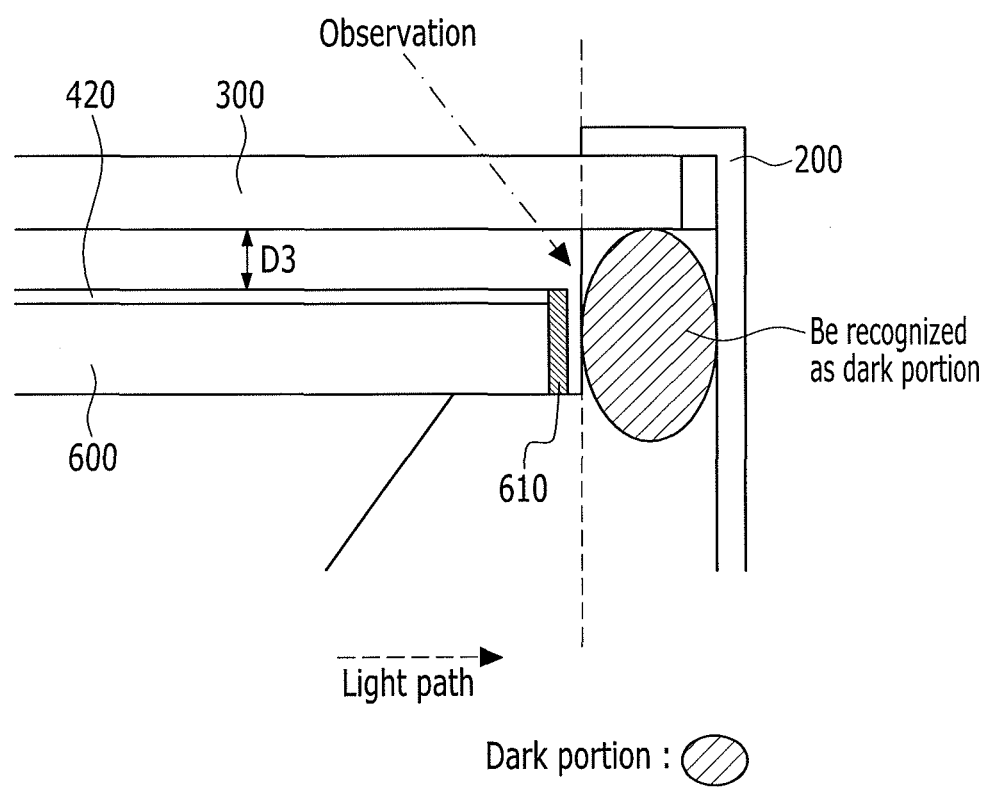
FIG. 4 illustrates a cross-sectional view illustrating an optical sheet and a diffuser according to another Comparative Example.

FIG. 4 illustrates a cross-sectional view illustrating an optical sheet and a diffuser according to another Comparative Example.

In the diffuser 600 according to another Comparative Example, a side of the diffuser 600 may be provided with a reflective sheet 610 to prevent the light leakage phenomenon occurring in FIG. 3. According to the Comparative Example of FIG. 4, light may not be transmitted through the side of the diffuser 600, and thus the light leakage phenomenon described above may not occur. However, when light is not generated from the side of the diffuser 600, the side of the diffuser 600 may be recognized as a dark portion when a user observes the side of the diffuser 600 through the display panel 300.

Figure 5:
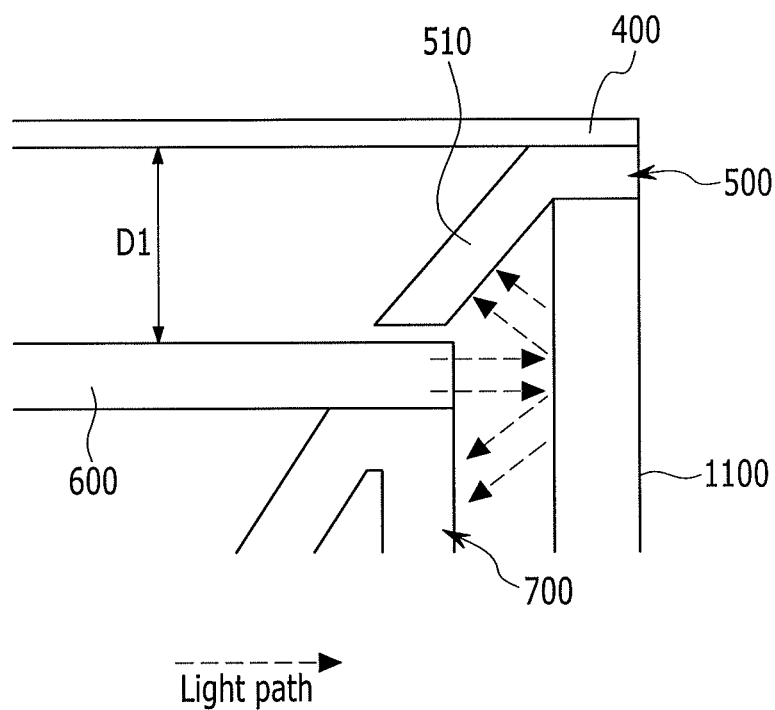
FIG. 5 illustrates another cross-sectional view of the optical sheet, the upper mold, the diffuser, and the lower mold according to an exemplary embodiment.

FIG. 5 illustrates another cross-sectional view of the optical sheet, the upper mold, the diffuser, and the lower mold according to an exemplary embodiment.

As illustrated in FIG. 5, the diffuser 600 according to an exemplary embodiment is spaced apart from the optical sheet 420 by D1. According to an exemplary embodiment, the D1 may be from 10 mm to 15 mm. Therefore, the diffuser 600 may be spaced apart from the display panel 300 by D1 or more.

As illustrated in FIG. 5, the light transmitted by the side of the diffuser 600 may be blocked by the inclined portion 510 of the upper mold 500. Therefore, the display device according to an exemplary embodiment may prevent or substantially prevent light leakage.

Further, the inclined portion 510 of the diffuser 600 may reflect the light transmitted by the diffuser 600 toward the display panel 300 to prevent the light from being leaked.

Another exemplary embodiment will be described with reference to FIGS. 6 and 7.

Figure 6:
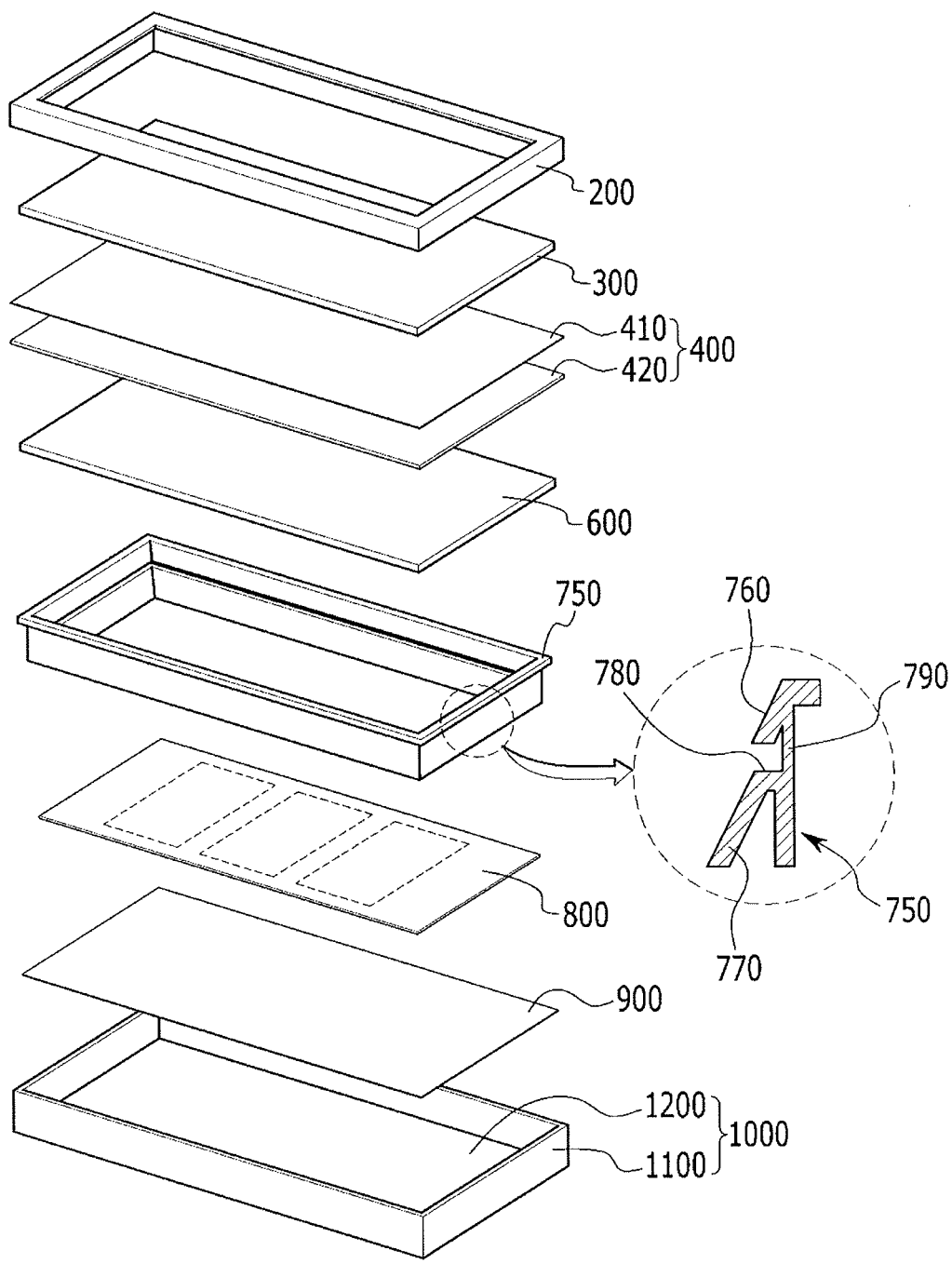
FIG. 6 illustrates an exploded perspective view of a display device including a backlight unit according to another exemplary embodiment.
Figure 7:
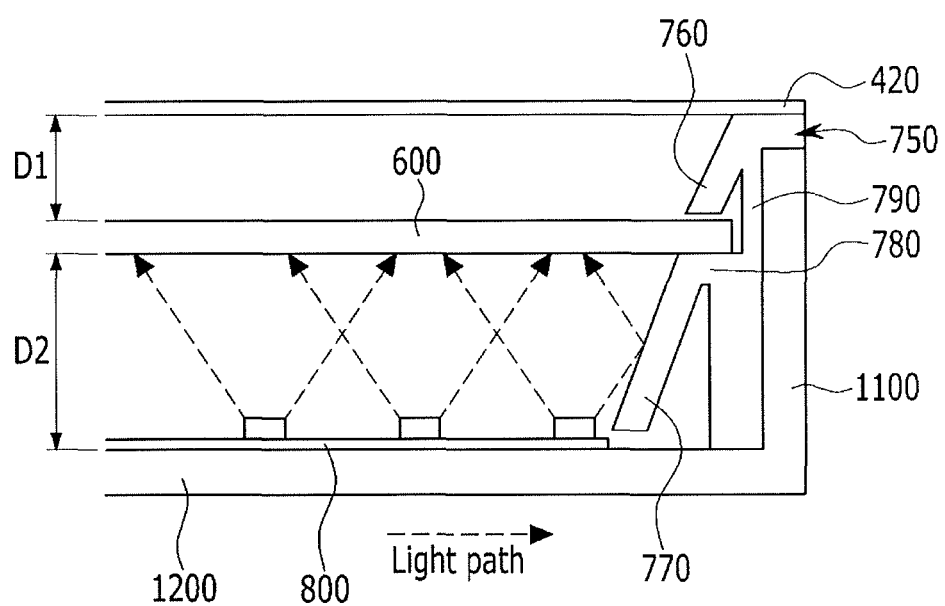
FIG. 7 illustrates a cross-sectional view of an optical sheet and an integrated mold according to an exemplary embodiment.

The configuration of the backlight unit illustrated in FIGS. 6 and 7 is substantially similar to the backlight unit illustrated in FIGS. 1 and 2, except that the backlight unit illustrated in FIGS. 6 and 7 may include an integrated mold 750, instead of including the upper mold 500 and the lower mold 700. Therefore, the similar description will be omitted.

The backlight unit according to another exemplary embodiment may include the integrated mold 750, instead of including the upper mold 500 and the lower mold 700. Further, the integrated mold 750 may be disposed on the light source plate 800. The integrated mold 750 may include a first inclined portion 760, a second inclined portion 770, a flat portion 780, and a connection portion 790.

The integrated mold 750 may perform the same function as that of the upper mold 500 or the lower mold 700. That is, the first inclined portion 760 may perform the same function as that of the inclined portion 510 of the upper mold 500 and the second inclined portion 770 may perform the same function as that of the inclined portion 710 of the lower mold 700.

A portion at which the inclination of the second inclined portion 770 ends may be connected to one side of the flat portion 780. Further, the other side of the flat portion 780 may be connected to one side of the connection portion 790. The other side of the connection portion 790 may be connected to the first inclined portion 760.

The diffuser 600 may be disposed between the flat portion 780 and the first inclined portion 760. The diffuser 600 may uniformly diffuse light incident from the light source and may improve the uniformity of the luminance of the light. That is, the diffuser 600 may disperse the light incident from the light source and prevent or substantially prevent the light from being locally concentrated.

When the display device is turned over, the first inclined portion 760 may support the diffuser 600.

The first inclined portion 760 may prevents a light leakage phenomenon occurring when light is transmitted by diffuser 600. Further, an upper end of the integrated mold 750 may be connected to the first inclined portion 760 and may be seated on the side portion 1100 of the bottom chassis 1000. The first inclined portion 760 may not contact the side portion 1100 of the bottom chassis 1000. The first inclined portion 760 may not contact the diffuser 600. The first inclined portion may contacts the diffuser 600 when the display device is turned over.

The upper end of the integrated mold 750 and the flat portion 780 may be connected to each other through the connection portion 790. The upper end of the integrated mold 750 may be spaced apart from the flat portion 780 by a length of the connection portion 790.

The second inclined portion 770 may be obliquely formed from the flat portion 780 toward the lower portion 1100 of the bottom chassis 1000. Further, the second inclined portion 770 may be formed so that the light generated from the light source may be reflected toward the display panel 300. A portion of the integrated mold 750 may be disposed on the lower portion 1100 of the bottom chassis 1000. A portion of the integrated mold 700 disposed on the lower portion 1100 of the bottom chassis 1000 may be connected to the second inclined portion 770 and the flat portion 780. The second inclined portion 770 may not contact the lower portion 1100 of the bottom chassis 1000. The second inclined portion 770 may reflect light generated from the an LED. The second inclined portion 770 may reflect light generated from a light source toward the display panel 300 and prevent or substantially prevent the light from being leaked.

According to an exemplary embodiment, the diffuser 600 may be seated on the flat portion 780. The flat portion 780 may serve as the upper end of the lower mold 700. The optical sheet 420 may be seated at the upper end of the integrated mold 750. Therefore, the optical sheet 420 may be disposed to be separated from the diffuser 600.

That is, as the diffuser 600 may be seated on the flat portion 780 and the optical sheet 420 may be seated at the upper end of the integrated mold 750, the diffuser 600 and the optical sheet 420 may be separated from each other. The upper end of the upper mold 750 may be flat such that the optical sheet 420 may be seated thereon. Further, the flat portion 780 may be flat such that the diffuser 600 may be seated thereon.

As illustrated in FIGS. 6 and 7, the integrated mold 750 may have the same shape as the shape in which the upper end of the lower mold 700 and the point at which the inclined portion 510 of the upper mold 500 ends are connected to each other by the connection portion 790.

Another exemplary embodiment will be described with reference to FIG. 8.

Figure 8:
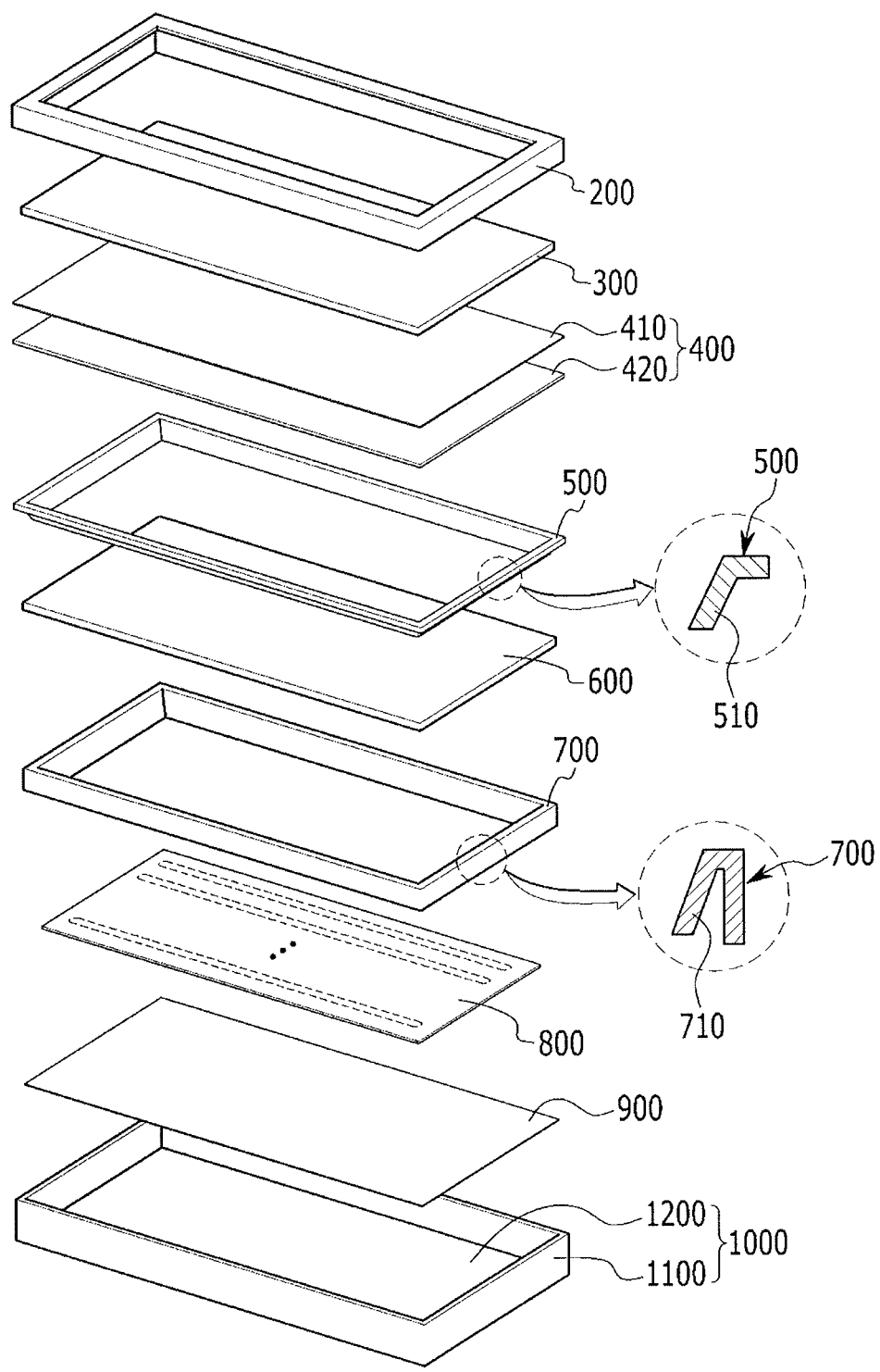
FIG. 8 illustrates an embodiment wherein a light source is a CCFL.

FIG. 8 illustrates a diagram illustrating a light source according to an exemplary embodiment may be a CCFL.

The remaining configuration in FIG. 8 is substantially similar to the backlight unit described in FIGS. 1 and 2, except that the backlight unit may include a CCFL instead of a LED as a light source. Therefore, the similar description will be omitted.

Hereinafter, the backlight unit according to yet another exemplary embodiment will be described with reference to FIGS. 8 and 2.

The backlight unit according to an exemplary embodiment may include the sheet 400, the upper mold 500, the diffuser 600, the lower mold 700, the light source plate 800, the reflective layer 900, and the bottom chassis 1000. However, the backlight unit illustrated in FIG. 8 is illustrative only, and therefore not limiting. Therefore, embodiments may be applied to a display device having another structure.

The light source plate 800 may includes a light source. The light source plate 800 may be made of at least one of glass, indium-tin-oxide (ITO), and indium-zinc-oxide (IZO) so that the light source plate 800 may transmit light reflected from the reflective layer 900.

An example of the light source included in the light source plate may include a cold cathode fluorescent lamp (CCFL), and the like.

The light source plate 800 may be formed in a single integrated plate without an opening and the light source plate 800 formed in a single integrated plate may be formed in plural. Each of the light source plates 800 formed in plural may be fastened with the lower portion 1200 of the bottom chassis 1000 or may be attached on the lower portion 1200 of the bottom chassis 1000 by using a tape, or the like.

The sheet 400 may include at least one optical sheet of the prism sheet 410 and the optical sheet 420, or the like. Depending on the exemplary embodiment, the single sheet 400 may also include a luminance enhancement film such as DBEF.

The sheet 400 may improve uniformity of luminance of light transmitted by the diffuser 600 and improve efficiency of light transmitted. The optical sheet 420 according to an exemplary embodiment may be disposed to be separated from the diffuser 600.

The diffuser 600 according to an exemplary embodiment may be disposed between the upper mold 500 and the lower mold 700. The diffuser 600 may uniformly diffuse light incident from the light source and may improve the uniformity and luminance of the light. That is, the diffuser 600 may disperse light incident from a light source to prevent or substantially prevent the light from being locally concentrated.

When the light generated from the light source is reflected and incident on the reflective layer 900, the reflective layer 900 may reflect the light toward the display panel 300.

The lower mold 700 may provide a region in which the diffuser 600 is seated. Further, the upper mold 500 may be formed on the diffuser 600. When the display device is turned over, the upper mold 500 may support the diffuser 600. Further, the upper mold 500 may provide a region in which the optical sheet 420 is seated. Because the diffuser 600 may be seated on the lower mold 700 and the optical sheet 420 may be seated on the upper mold 500, the diffuser 600 and the optical sheet 420 may be separated from each other. The upper end of the upper mold 500 may be flat such that the optical sheet 420 may be seated thereon. Further, the upper end of the lower mold 700 may be flat such that the diffuser 600 may be seated thereon.

The upper mold 500 according to an exemplary embodiment may include an inclined portion 510. The inclined portion 510 of the upper mold 500 may prevent the leakage of light transmitted by the diffuser 600. Further, a portion of the upper mold 500 may be seated on the side portion 1100 of the bottom chassis 1000. The inclined portion 510 of the upper mold 500 may not contact the side portion 1100 of the bottom chassis 1000. The inclined portion 510 of the upper mold 500 may not contact the diffuser 600. The inclined portion 510 may contact the diffuser 600 when the display device is turned over.

The lower mold 700 according to an exemplary embodiment may include the inclined portion 710. The inclined portion 710 of the lower mold 700 may be obliquely formed from the upper end of the lower mold 700 to the lower portion 1100 of the bottom chassis 1000. Further, the inclined portion 710 of the lower mold 700 may be formed so that the light generated from the light source may be reflected from the inclined portion 710 of the lower mold 700 toward the display panel 300. A portion of the lower mold 700 may be disposed on the lower portion 1100 of the bottom chassis 1000. A portion of the lower mold 700 disposed on the lower portion 1100 of the bottom chassis 1000 may be formed with the inclined portion 710 of the lower mold 700. The inclined portion 710 of the lower mold 700 may reflect light generated from the light source. The lower mold 700 may not contact the lower portion 1100 of the bottom chassis 1000. The inclined portion 710 of the lower mold 700 according to an exemplary embodiment may reflect light generated by a CCFL. As the inclined portion 710 of the lower mold 700 reflects the light, the inclined portion 710 of the lower mold 700 may reflect the light generated from a light source toward the display panel 300 to prevent or substantially prevent light leakage.

The diffuser 600 may be separated from the optical sheet 420 so as to be disposed between the inclined portion 510 of the upper mold 500 and the upper end of the lower mold 700. Therefore, the diffuser 600 may be disposed to be spaced apart from the optical sheet 420 at a predetermined distance D1. Therefore, the diffuser 600 may be disposed to be spaced apart from the lower portion 1100 of the bottom chassis 1000 at a predetermined distance D2.

According to an exemplary embodiment, D1 may be from 10 mm to 15 mm. According to an exemplary embodiment, D1 may be from 15 mm to 20 mm.

By way of summation and review, display devices generally include a display module and a driving unit for driving the display module.

The display module of the light receiving display device includes a display panel, and a backlight unit supplying light to the display panel. In the display module, the display panel and the backlight unit are integrated by being coupled with each other so as to prevent a light loss and a case protecting the display module by enclosing the display module is provided so as to prevent the display module from being damaged due to an external impact.

The backlight unit includes a light source package including at least one light source which generates light. As an example of the light source, there are a cold cathode fluorescent lamp (CCFL), a flat fluorescent lamp (FFL), a light emitting diode (LED), and the like. Recently, the light emitting diode (LED) having less power consumption and heating value is frequently used as the light source.

The backlight unit may uniformly irradiate light to a back surface of the display panel and may be classified into a direct type backlight unit, an edge type backlight unit, and the like, depending on a position of the light source in the backlight unit.

Recently, as a size of the panel of the display device is increased, a width of a bezel is also reduced. Therefore, a space for fixing a sheet, a diffuser, or the like, beneath the bezel may be insufficient.

In contrast, embodiments provide a backlight unit capable of stably fixing a diffuser, or the like, even though a width of a bezel may be reduced. Embodiments also provide and a display device including the same.

According to exemplary embodiments, it is possible to stably fix the diffuser, or the like, even though the width of the bezel is reduced, by preventing the diffuser from overlapping the optical sheet.

DESCRIPTION OF SYMBOLS

1000: Bottom chassis
1100: Side portion of bottom chassis
1200: Lower portion of bottom chassis
200: Top chassis
300: Display panel
400: Sheet
410: Prism sheet
420: Optical sheet
600: Diffuser
500: Upper mold
510: Inclined portion
610: Reflective sheet
700: Lower mold
710: Inclined portion of lower mold
750: Integrated mold
760: First inclined portion
770: Second inclined portion
780: Flat portion
790: Connection portion
800: Light source plate
900: Reflective layer Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A backlight unit, comprising:
    a bottom chassis including a lower portion and side portions enclosing the lower portion;
    a light source plate to transmit light and to which a light source is attached;
    a diffuser for diffusing light generated from the light source;
    an optical sheet on the diffuser for further diffusing the light diffused by the diffuser; and
    a first mold including a first inclined portion between the diffuser and the optical sheet to prevent the diffuser and the optical sheet from contacting each other, and the first inclined portion obliquely formed relative to the lower portion of the bottom chassis and reflecting light emitted from a side of the diffuser toward the bottom chassis.

2. The backlight unit as claimed in claim 1, wherein an end of the first inclined portion is seated on one of the side portions of the bottom chassis.

3. The backlight unit as claimed in claim 2, wherein:
    the optical sheet is disposed at an upper end of the first mold, and the diffuser is under the first inclined portion.

4. The backlight unit as claimed in claim 3, further comprising:
a second mold,
wherein the diffuser is seated on an upper portion of the second mold and is spaced apart from the first inclined portion.

5. The backlight unit as claimed in claim 4, wherein the second mold further includes a second inclined portion which reflects the light generated from the light source toward the diffuser.

6. The backlight unit as claimed in claim 5, wherein:
a portion of the second mold is disposed on the bottom chassis, and
the second inclined portion is spaced apart from the bottom chassis.

7. The backlight unit as claimed in claim 6, wherein the first mold is connected to the second mold by a connection portion.

8. The backlight unit as claimed in claim 7, wherein the connection portion connects the upper portion of the second mold to an end portion of the first inclined portion of the first mold.

9. The backlight unit as claimed in claim 8, wherein the light source is a light emitting diode.

10. The backlight unit as claimed in claim 8, wherein the light source is a cold cathode fluorescent lamp.

11. A display device, comprising:
a display panel; and
a backlight unit adapted to supply light to the display panel,
wherein the backlight unit includes:
a bottom chassis including a lower portion and side portions enclosing the lower portion;
a light source plate to transmit light and onto which a light source is attached;
a diffuser for diffusing light generated from the light source;
an optical sheet on the diffuser for further diffusing the light diffused by the diffuser; and
a first mold including a first inclined portion between the diffuser and the optical sheet, to prevent the diffuser and the optical sheet from contacting to each other, and the first inclined portion obliquely formed relative to the lower portion of the bottom chassis and reflecting light emitted from a side of the diffuser toward the bottom chassis.

12. The display device as claimed in claim 11, wherein an end of the first inclined portion of the first mold is seated on one of the side portions of the bottom chassis.

13. The display device as claimed in claim 12, wherein:
the optical sheet is disposed at an upper end of the first mold, and
the diffuser is under the first inclined portion.

14. The display device as claimed in claim 13, further comprising:
a second mold,
wherein the diffuser is seated on an upper portion of the second mold and is spaced apart from the first inclined portion.

15. The display device as claimed in claim 14, wherein the second mold further includes a second inclined portion which reflects the light generated from the light source toward the diffuser.

16. The display device as claimed in claim 15, wherein:
a portion of the second mold is disposed on the bottom chassis, and
the second inclined portion is spaced apart from the bottom chassis.

17. The display device as claimed in claim 16, wherein the first mold is connected to the second mold by a connection portion.

18. The display device as claimed in claim 17, wherein the connection portion connects the upper portion of the second mold to an end portion of the first inclined portion of the first mold.

19. The display device as claimed in claim 18, wherein the light source is a light emitting diode.

20. The display device as claimed in claim 18, wherein the light source is a cold cathode fluorescent lamp.

21. The display device as claimed in claim 1, further comprising a reflective layer between the lower portion of the bottom chassis and the light source plate for reflecting light generated from the light source.

22. The display device as claimed in claim 11, further comprising a reflective layer between the lower portion of the bottom chassis and the light source plate for reflecting light generated from the light source toward the display panel.

* * * * *